United States Patent [19]

Thirion de Briel et al.

[11] Patent Number: 4,639,239

[45] Date of Patent: Jan. 27, 1987

[54] SPEED CHANGE DEVICE PULLEY WITH A SEAL AROUND THE HUB

[75] Inventors: Jacques Thirion de Briel, Levallois-Perret; Michel Jaccod, Champigny-sur-Marne, both of France

[73] Assignee: Valeo, Paris, France

[21] Appl. No.: 797,526

[22] Filed: Nov. 13, 1985

[30] Foreign Application Priority Data

Nov. 15, 1984 [FR] France ................ 84 17437

[51] Int. Cl.$^4$ .............................................. F16H 55/56
[52] U.S. Cl. .......................................... 474/8; 474/28
[58] Field of Search ........................................ 474/8, 28

[56] References Cited

U.S. PATENT DOCUMENTS

| | | |
|---|---|---|
| 2,952,161 | 9/1960 | Williams . |
| 3,771,800 | 11/1973 | Wilson ................ 277/187 |
| 4,178,808 | 12/1979 | Bacher . |
| 4,573,948 | 3/1986 | Thirion de Briel ........... 474/28 |

FOREIGN PATENT DOCUMENTS

| | | |
|---|---|---|
| 2197440 | 3/1974 | France . |
| 2376347 | 7/1978 | France . |
| 2546257 | 11/1984 | France . |
| 2105403 | 3/1983 | United Kingdom . |

Primary Examiner—James A. Leppink
Assistant Examiner—Frank H. McKenzie, Jr.
Attorney, Agent, or Firm—Charles E. Brown; Charles A. Brown

[57] ABSTRACT

It is a matter of a variable speed drive pulley with which is associated a regulating chamber adapted to be connected to a source of fluid, this regulating chamber being sealed in particular by a seal which, coupled axially to the mobile flange, is disposed in line with an abutment spacer also defining one of the extreme positions of the mobile flange. The abutment spacer is carried by the bush of the mobile flange on the side of the bush facing the other flange, it features a transverse collar which is directed radially towards the axis of the assembly and by which it delimits, for its part, a housing in which is disposed the associated seal and, conjointly, passages are provided in a generally radial direction in said bush and the hub of the assembly.

15 Claims, 5 Drawing Figures

SPEED CHANGE DEVICE PULLEY WITH A SEAL AROUND THE HUB

The present invention is generally concerned with variable speed drives.

It concerns, for example, those adapted for use on an automotive vehicle for driving any ancillary device such as an alternator, water pump, compressor or fan from the motor of the vehicle.

As is known, each of the two pulleys that a variable speed drive of this kind comprises, one driven and the other driving, features a hub and, in face-to-face relationship around said hub, two annular flanges adapted to receive a belt at least one of which, hereafter referred to for convenience as the mobile flange, is mounted to be mobile axially relative to said hub being, for this purpose, fastened in the axial direction to a bush slidably engaged thereon with, more often than not, disposed between said bush and said hub, two pads of anti-friction material axially spaced from one another.

In practice, the mobile flange can thus move axially between two end positions, one advanced, the other retracted, relative to the other flange, referred to hereafter for convenience as the fixed flange, with which it is associated, it being understood that when the mobile flange of the driving pulley is in the advanced position the mobile flange of the driven pulley is in the retracted position and vice-versa, the corresponding belt occupying a defined position in each case corresponding to a particular transmission ratio.

In order for the extreme configurations of the assembly to correspond to specific transmission ratios, it is important that the extreme, that is advanced or retracted, positions of the mobile flange of both pulleys are themselves accurately defined.

It is usual for this purpose to associate with the mobile flange of at least one of the pulleys, the driving pulley, for example, abutment means adapted to limit its axial displacement in both directions in a defined manner.

The present invention is more particularly directed to the case where, in order to provide continuous control over the configuration of the assembly, there is associated with at least one of the pulleys, the driving pulley, for example, a regulating chamber adapted to be connected to an appropriate source of fluid, such as a source of pressurized or depressurized pneumatic fluid.

This is the case, for example, in French Patent Application No. 83 08047 filed May 16, 1983.

In practice, in this application the fact that the elastic return means associated with the mobile flange of the driving pulley, for example, comprises an annular part of variable cone angle, commonly called the diaphragm, is exploited in order to constitute a regulating chamber of this kind between this annular part, which bears on the mobile flange and is supported on a support member fastened to the hub, and said mobile flange and said hub, said annular member and its bearing points on the mobile flange and the bearing member being rendered fluid-tight to this end in some appropriate manner, and said hub further comprising an internal opening and at least one passage through which the thus constituted regulating chamber may be connected to the fluid source concerned.

Conjointly with this, sealing between the mobile flange and the hub is provided by a seal disposed in the regulating chamber around the hub and anchored in a groove in the bush which said mobile flange comprises, and is thus linked to it so as to move with it.

As a corollary to this, in this French Patent Application the abutment means associated with the mobile flange of the driving pulley in order to define its advanced and retracted positions consist, on the one hand, for the advanced position, in the bush itself of the mobile flange, this being sufficiently extended for this purpose in the direction towards the corresponding fixed flange so as to be able to bear on the latter through its edge, and, on the other hand, for the retracted position, by a spacer, or abutment spacer, which, constituting an annular member attached for this purpose to the mobile flange, coaxially relative to the bush, around the latter, is adapted to bear through its edge on the associated bearing member.

It is in practice in line with this abutment spacer that the seal surrounding the hub is disposed.

It is therefore on the side of the bearing member corresponding to the retracted position, or rear abutment, of the mobile flange that a seal of this kind is disposed in this case, in the regulating chamber.

These arrangements have given and may still give satisfaction.

They have various disadvantages, however, as follows.

Firstly, for anchoring the seal which in the French Patent Application No. 83 08047 is in practice a lip seal it is necessary to form a groove in the bush of the mobile flange.

This reguires a specific machining operation which is relatively delicate and costly and results in local weakening of the mechanical strength of the bush, which must be compensated for in advance by conferring on it the appropriate thickness, although this is redundant elsewhere.

The same applies if a conventional seal is substituted for the lip seal, as it must also be accommodated in a groove in the bush.

In both cases the necessary increase in the thickness of the bush is naturally achieved to the detriment of the overall diameter of the assembly.

Also, the abutment spacer which extends in this case to the interior of the regulating chamber occupies a non-negligible volume within the latter making it difficult to fit a supplementary return spring for the mobile flange, which often proves to be necessary.

Also, the fitting of the seal on the side of the bearing plate means that the outlets from the passages provided in the hub to serve the regulating chamber are also disposed on this side, in the vicinity of the bearing plate, and in certain applications at least the presence at this location of these passages may itself be deleterious, especially when the shaft to which the hub is attached must be engaged to a greater or lesser axial depth in the latter.

Finally, the passage to be formed in the hub for its internal space to communicate with the associated regulating chamber is almost bound to have an axial section and a radial section, which complicates the structure, and conjointly with this the bush of the mobile flange has to be apertured at its end.

A general object of the present invention is an arrangement enabling these disadvantages to be alleviated and conferring further advantages.

More precisely, its object is a variable speed drive pulley of the kind comprising a hub which has an internal opening and, in face-to-face relationship to each other around said hub, two annular flanges of which at least one, hereafter referred to for convenience as the mobile flange, is mounted so as to be mobile axially relative to said hub being for this purpose axially fastened to a bush slidably engaged on the latter with, disposed between said bush and said hub, two pads of anti-friction material axially spaced from each other, in association with a spacer, herinafter referred to for convenience as the abutment spacer, which is also fastened axially to the mobile flange and adapted to limit its axial displacement in one direction, and in association with a regulating chamber which, adapted to be connected to a source of fluid, is defined at least in part by the mobile flange, the hub and a seal disposed around said hub in line with said abutment spacer and linked to move with said mobile flange, this variable speed drive pulley being characterized, in combination, on the one hand in that the abutment spacer is carried by the end of the bush of the mobile flange directed towards the fixed flange and it features, transversely, a collar which is directed radially towards the axis of the assembly and by virtue of which it delimits, for its part, a housing in which is disposed the associated seal, and, on the other hand, in that for the purpose of connecting the regulating chamber to a source of fluid there is provided in the bush between the anti-friction material pads at least one passage and, in the hub, also between said anti-friction material pads, for communication between the internal space of the hub and the volume delimited by the anti-friction material pad between it and the bush, at least one passage.

Thus according to an arrangement which is exactly the converse of that described in the aforementioned French Patent Application, it is the abutment spacer in accordance with the invention which defines the advanced position of the mobile flange, whereas the bush of the latter defines its retracted position.

Be this as it may, in order to link the seal axially to the hub there is no need, in accordance with the invention, to provide for it any form of groove in the bush of the latter.

Also, the abutment spacer in accordance with the invention is advantageously carried by the bush of the mobile flange, instead of being carried by the latter.

Amongst other things, this minimizes its overall size, and more specifically releases the space needed for installing a supplementary return spring when the use of a supplementary return spring of this kind is desirable.

Also, the passage to form in the hub for communication between its internal space and the associated regulating chamber may advantageously comprise only one section, which simplifies its manufacture, and that to be conjointly provided in the bush of the mobile flange may advantageously be disposed generally radially in the latter, rather than this bush being apertured at its end, also simplifying manufacture.

Finally, in order to be attached to the bush of the mobile flange the abutment spacer may be very simply engaged, to its full diameter for example, over the bush, or engaged, by a section of reduced diameter, for example, inside the latter.

In either case such engagement may be exploited to bring about, at the time of assembly, axial stressing of the seal in its housing, which is favourable to the required sealing effect.

In practice the collar of the abutment spacer preferably extends to the free end thereof, so that it of itself constitutes the portion of the abutment spacer by which the latter is adapted to limit axial displacement of the mobile flange in one direction.

This collar may be formed by a folded over edge of the abutment spacer, for example, It may also be formed by a folded edge doubled in surface area be being folded back on itself, in the direction away from the axis of the assembly.

In either case a folded edge of this kind advantageously lends itself to receiving an anti-friction coating, to minimize the risk of wear and indentation to which the abutment bearing surfaces corresponding to the axial direction in question are exposed in the event of rotational flexing to which the mobile flange is inevitably exposed in service by virtue of its radial assembly clearance relative to the hub.

Thus, in accordance with the invention, it is advantageously the abutment spacer which carries the anti-friction coating, in a very simple manner.

The document U.S. Pat. No. 2,952,161 describes a variable speed drive pulley to the bush of each of the flanges of which there is attached, at the end of a bush of this kind, an abutment spacer defining with the bush a housing in which is disposed a seal.

However, this is in practice a variable speed drive pulley of different configuration to that concerned here, both flanges of this variable speed drive pulley being mobile, with solid bushes having no passage through them and no regulating chamber.

The characteristics and advantages of the invention will moreover emerge from the following description given by way of example with reference to the accompanying schematic drawings in which.

Figure 1:
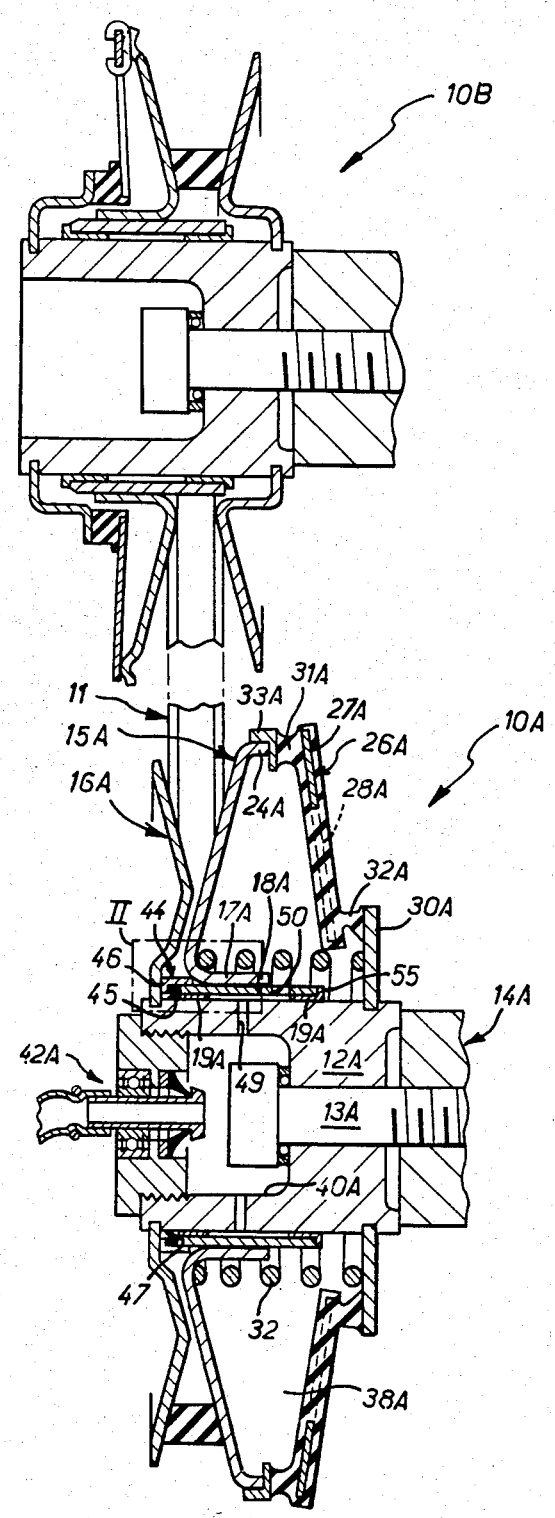
FIG. 1 is a view in axial cross-section of a variable speed drive using a pulley in accordance with the invention.

These figures show a variable speed drive of the type described in the aforementioned French patent application No. 83.08047.

It comprises a driving pulley 10A, a driven pulley 10B and a belt 11 passing in an endless loop around the latter.

The driving pulley 10A comprises a hub 12A which, for example and as shown, is attached by a screw 13A to the end of any form of drive shaft 14A, being thus constrained to rotate with the latter, and in face-to-face relationship around said hub 12A, for receiving the belt 11, two annular flanges 15A, 16A with frustoconical flanks at least one of which, in practice the flange 15A referred to hereafter for convenience as the mobile flange, is mounted to be mobile axially relative to the hub 12A.

In practice only the flange 15A is mobile in this way relative to the hub 12A, the associated flange 16A hereafter referred to for convenience as the fixed flange being fastened axially and in rotation to the hub 12A, having its inside periphery crimped to the end of said hub 12A for example, as shown.

For mobility on the hub 12A, the mobile flange 15A is attached axially to a bush 18A slidably engaged over the hub 12A.

In practice, in the embodiment shown the mobile flange 15A features to this end in its central area an axial collar 17A which extends in the direction opposite to the fixed flange 16A and by means of which it is attached, as by a simple force fit or by welding, for example, to said bush 18A and between the latter and the hub 10A there are disposed two anti-friction material pads 19A which are appropriately spaced from each other in the axial direction and which, for example and as shown, are disposed at respective ends of the bush 18A.

In practice the mobile flange 15A is in one piece with its axial collar 17A and at its periphery it features an axial rim 24A in one piece with it and in the same direction as the axial collar 17A.

The resulting mobile flange 15A is continuously urged towards the fixed flange 16A by axially acting elastic return means.

In the embodiment shown these comprise, on the one hand, a variable cone angle annular part 26A or diaphragm which through a peripheral part 27A forming a Belleville spring washer is axially supported for tilting against the mobile flange 15A, more precisely against the edge of the axial rim 24A of the latter, and which through a central part 28A divided into radial fingers is supported axially for tilting against a member 30A, hereafter referred to for convenience as the bearing member, fastened axially (and in the embodiment shown circumferentially) to the hub 12A and, on the other hand, disposed coaxially around the axial collar 17A of the mobile flange 15A, a helical coil spring 32 which, also bearing on the bearing member 30A, presses on the inside surface of the mobile flange 15A where the frustoconical flank thereof merges with its axial collar 17A.

The tilting support of the diaphragm 26A on the mobile flange 15A and on the bearing member 30A are achieved through the intermediary of elastic material spacers 31A, 32A, respectively, and these are in one piece with an elastic material mass, a rubber mass, for example, entirely coating the annular part 26A.

In practice the annular spacer 31A, which thus forms part of the elastic material mass, is stuck to a connecting member 33A, of metal, for example, by which the assembly is fastened at least axially, and in practice both axially and circumferentially, as by welding for example, to the axial rim 24A of the mobile flange 15A and, likewise, the annular spacer 32A is stuck to the bearing number 30A.

A chamber or regulating chamber 38A is therefore defined between the mobile flange 15A, the hub 12A and the assembly consisting of the annular member 26A, its elastic material coatings, the annular spacers 31A, 32A and the bearing member 30A, said annular member 26A being embedded in the corresponding elastic material mass, as indicated hereinabove.

This regulating chamber 38A is intended to be connected to a source of fluid, and in particular to a pressurized or depressurized source of pneumatic fluid.

To this end it communicates through passages to be described hereafter with an internal space 40A of the hub 10A and the latter is itself adapted to be connected in fluid-tight manner by a termination 42A to the fluid source concerned.

These arrangements are well known of themselves, notably through French patent application No. 83.08047, and therefore they will not be described in further detail here.

In a manner also known of itself, abutment means are associated with the mobile flange 15A in order to define the extreme advanced and retracted positions and these comprise, for a first axial direction, the bush 18A to which it is axially attached and, for the opposite axial direction, an annular spacer 44 referred to hereafter for convenience as the abutment spacer, which is fastened axially to the mobile flange 15A and is also adapted to limit its axial displacement, in the opposite direction.

In the manner known in itself, there is provided, in order to enhance the sealing of the regulating chamber 30A, a seal 45 disposed around the hub 12A and elastically clamped in line with the abutment spacer 44, connected to the mobile flange 15A so as to move with it.

In accordance with the invention, and in combination, on the one hand the abutment spacer 44 is carried by the bush 18A, at the end of the latter directed towards the fixed flange 16A, and it features a transverse collar 46 which is directed radially towards the axis of the assembly and by means of which it delimits, for its part, the housing 47 in which is disposed the seal 45 and, on the other hand, for connecting the regulating chamber 38A to the source of fluid used, there is provided in the bush 18A, between the anti-friction material pads 19A, at least one passage 50 which is in practice generally radially disposed in said bush 18A, and in the hub 12A, also between the anti-friction material pad 19A, for communication between the internal space 48 of the hub 12A with the volume delimited by the anti-friction material pads 19A between it and the bush 19A, at least one passage 49.

In the embodiments shown, a passage 49 of this kind is formed generally radially in the hub 12A concerned, but as an alternative it could equally well lie on a more or less accentuated slant.

Be this as it may, it advantageously comprises only one rectilinear section and it is therefore easy to fabricate.

Figure 2:
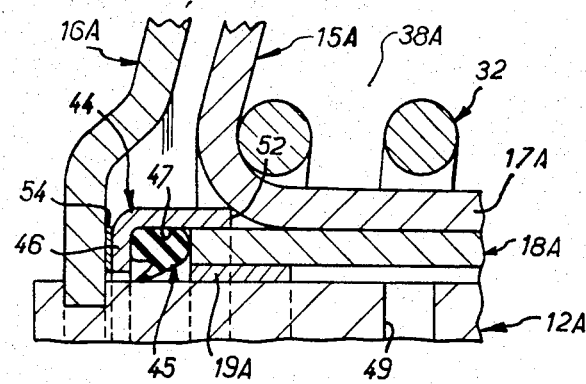
FIG. 2 shows to a larger scale the detail of FIG. 1 shown by a box II thereon.

In the embodiment specifically shown in FIGS. 1 and 2, the abutment spacer 44 is engaged to its full diameter over the bush 18A, being force fitted to it, for example.

In this embodiment the housing 47 for the seal 45 is thus delimited by the collar 46 that the abutment spacer 44 features to this end in accordance with the invention, the hub 12A and the bush 18A, more precisely the edge at the corresponding end of the latter.

At the time of assembly an arrangement of this kind may advantageously be exploited for fitting the seal 45 in a stressed condition.

Thus in accordance with the invention the seal 45 is axially stressed in its housing 47 between the edge of the corresponding end of the bush 18A of the mobile flange 15A and the collar 46 of the abutment spacer 44 attached to said bush 18A.

In the embodiment shown, this seal 45 is a lip seal, the lip of which bears on the hub 12A.

Thus only the body of the seal 45, that is to say the part of which from which projects annularly towards the axis of the assembly the corresponding lip, is axially stressed in the housing 47.

Preferably, and as shown, the abutment spacer 44 is in contact with the mobile flange 15A through its edge opposite its collar 46.

It thus defines the advanced position of the mobile flange 15A, by abutment against the associated fixed flange 16A.

Be this as it may, the abutment spacer 44 being in this way sleeved over the bush 18A of the mobile flange 15A between the latter and the fixed flange 16A, it does not affect the overall radial size of the assembly.

In practice, in the embodiment shown, its collar 46 is formed by a simple folded edge and it thus through this collar 46, more precisely through its outside surface, that it is adapted to abut against the fixed flange 16A.

As shown, the collar 46 preferably carries on its outside surface, contacting the fixed flange 16A, an anti-friction material coating 54.

An anti-friction material coating 54 of this kind may be formed by spraying an appropriate synthetic material, for example.

Whereas the abutment spacer 34 is thus adapted to define the advanced position of the mobile flange 15A, the retracted position of the latter is defined by the bush 18A to which it is fastened, by this bush butting up against the bearing member 30A.

As shown, the corresponding edge of the bush 18A itself preferably carries an anti-friction coating 55 to contact the bearing member 30A and, as shown, this may simply be in one piece with the corresponding pad 19A.

As will be noted, the anti-friction material coatings 54, 55 thus extend transversely at the end of the assembly formed by the mobile flange 15A, its bush 18A and the abutment spacer 45 attached to the latter, at the respective axial ends.

Figure 3:
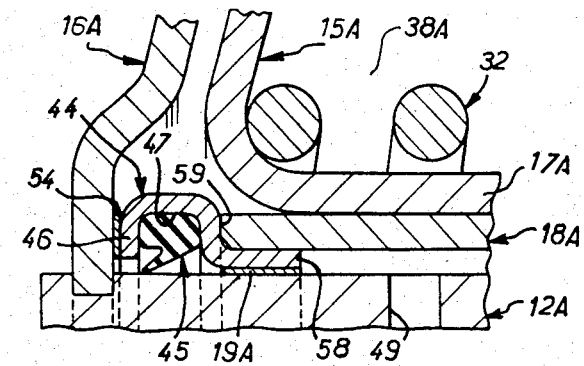
FIGS. 3 through 5 are views analogous to that of FIG. 2 and each concerns a respective alternate embodiment.

In the alternate embodiment shown in FIG. 3, the abutment spacer 44 is inserted into the bush 18A of the mobile flange 15A by means of a section 58 of reduced diameter.

As shown, it is this reduced diameter section 58 of the abutment spacer 54 which preferably carries the corresponding anti-friction material pad 19A.

Also, and also as shown, the abutment spacer 44 contacts the corresponding edge of the bush 18A through a transverse shoulder 59 formed by the outside surface of its radial section linking to its main part its reduced diameter section 58.

Thus, and as previously, it is again the abutment spacer 44 which defines the advanced position of the mobile flange 15A.

In the embodiment shown, it is again the collar 56 which bears on the fixed flange 16A and, as previously, it is formed by a simple folded edge.

Figure 4:
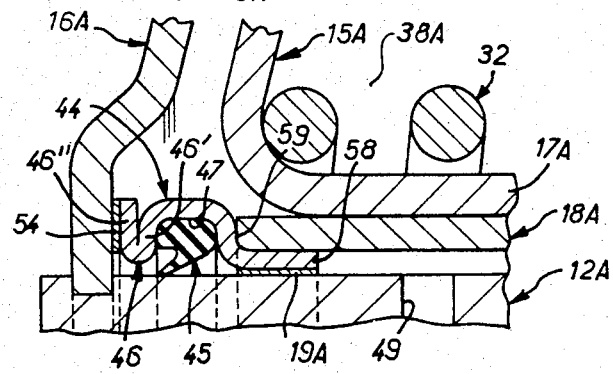

As an alternative to this (FIG. 4), the collar 46 of the abutment spacer 44 consists of a folded edge 46' thereof doubled in surface area by folding the folded edge 46' back on itself (46") in the direction away from the axis of the assembly.

This advantageously stiffens the resulting collar 46.

Also, in this case, the anti-friction material coating 54 carried by the collar may be fabricated by the same process as the corresponding anti-friction material pad 19A, being for example deposited in advance on the blank from which the abutment spacer 44 is subsequently formed.

In this case, the anti-friction material coating 54 and the corresponding pad 19A are applied to the same surface of a blank of this kind.

It is to be understood that as previously the seal 45 is preferably axially stressed in its housing 47 although, ignoring the hub 12A, the latter is then defined in its entirety by the abutment spacer 45 only.

In the foregoing, and as indicated hereabove, the seal 45 used is a lip seal since in practice the regulating chamber 38A is adapted to be depressurized and a lip seal of this kind is suited to such depressurization, its lip being oriented in consequence.

However, it will be understood that any other type of seal may also be used, in particular a seal in two radially superposed parts, the radially innermost part of rectangular cross-section and the other forming an O-ring extending around the first, a two-part O-ring seal of this kind being equally suitable for pressurization and depressurization.

Figure 5:
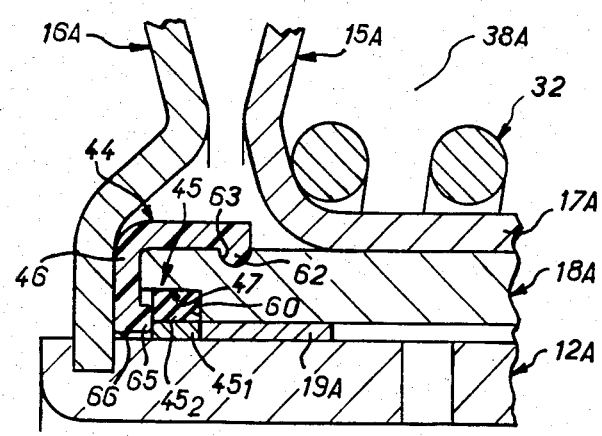

FIG. 5 shows this possibility.

For example, the radially innermost part $45_1$ of the seal 45 thus obtained is in an anti-friction material and its radially outermost part $45_2$ in an elastomer material.

Also, in the embodiment shown in FIG. 5 the housing 47 for the seal 45 is delimited by the collar 46 of the abutment spacer 44, a recess 60 in the edge of the corresponding end of the bush 18A on which the latter is engaged, and the hub 12A.

As shown, in this case the abutment spacer 44 bears axially against the remaining portion 61 of said edge of the bush 18A.

In the embodiment shown, the abutment spacer 44 which is similar to that described with reference to FIGS. 1 and 2 is of a synthetic material.

It thus advantageously features on its inside surface a projection 62, in the form of an annular bead, for example, by means of which it is engaged with a groove 63 of limited radial amplitude provided for it on the outside surface of the bush 18A.

It also features, projecting from the inside surface of its collar 46, an annular boss 65 for axially stressing the seal 45 and, projecting from the edge of said collar 46, an annular bead 66 to contact the hub 12A.

However, it may instead be of metal, as previously.

In this case it is force fitted over the bush 18A and does not comprise any boss 65 or bead 66.

The present invention is moreover not limited to the embodiments described and shown, but encompasses any variant execution and/or combination of their various parts.

As for the drive pulley 10B, there may or may not be associated with it a regulating chamber.

In the embodiment shown this is not the case.

This is the reason why it has not been described here.

However, it goes without saying that the arrangements described with reference to the driving pulley 10A may equally well be applied to it.

What we claim is:

1. Variable speed drive pulley of the kind comprising a hub which has an internal opening and, in face-to-face relationship to each other around said hub, two annular flanges of which at least one, hereafter referred to for convenience as the mobile flange, is mounted so as to be mobile axially relative to said hub being for this purpose axially fastened to a bush slidably engaged on the latter with, disposed between said bush and said hub, two pads of anti-friction material axially spaced from each other, in association with a spacer, hereinafter referred to for convenience as the abutment space, which is also fastened axially to the mobile flange and adapted to limit its axial displacement in one direction, and in association with a regulating chamber which, adapted to be connected to a source of fluid, is defined at least in part by the mobile flange, the hub and a seal disposed around said hub in line with said abutment spacer and linked to move with said mobile flange, this variable speed drive pulley being characterized, in combination, on the one hand in that the abutment spacer is carried by the end of the bush of the mobile flange directed towards the fixed flange and it features, transversely, a collar which is directed radially towards the axis of the assembly and by virtue of which it delimits, for its part, a housing in which is disposed the associated seal, and, on the other hand, in that for the purpose of connecting the regulating chamber to a source of fluid there is provided in the bush between the anti-friction material pads at least one passage and, in the hub, also between said anti-friction material pads, for communication between the internal space of the hub and the volume delimited by the anti-friction material pad between it and the bush, at least one passage.

2. Variable speed drive pulley according to claim 1, characterized in that the abutment spacer is engaged over the bush of the mobile flange.

3. Variable speed drive pulley according to claim 2, characterized in that the edge of the abutment spacer is in contact with the mobile flange.

4. Variable speed drive pulley according to claim 2, characterized in that a projection on the inside surface of the abutment spacer is engaged with a groove provided for this purpose on the outside surface of the bush.

5. Variable speed drive pulley according to claim 2, characterized in that the housing of the seal is delimited by the collar of the abutment spacer, the edge of the corresponding edge of the bush over which it is engaged, and the hub.

6. Variable speed drive pulley according to claim 2, characterized in that the housing of the seal is delimited by the collar of the abutment spacer, an opening in the edge of the corresponding end of the bush over which it is engaged and the hub and through the intermediary of said collar the abutment spacer bears axially against the remaining portion of said edge of the bush.

7. Variable speed drive pulley according to claim 1, characterized in that a reduced diameter section of the abutment spacer is engaged in the bush of the mobile flange.

8. Variable speed drive pulley according to claim 7, characterized in that one of the anti-friction material pads provided between the bush of the mobile flange and the hub is carried by the reduced diameter section of the abutment spacer.

9. Variable speed drive pulley according to claim 7, characterized in that a transverse shoulder on the abutment spacer is in contact with the edge of the bush of the mobile flange.

10. Variable speed drive pulley according to claim 7, characterized in that, except for the hub, the housing of the seal is defined by the abutment spacer only.

11. Variable speed drive pulley according to claim 1, characterized in that the collar of the abutment spacer is disposed at the free end thereof so that it constitutes of itself the portion of the abutment spacer by which the latter is adapted to limit in one direction axial displacement of the mobile flange.

12. Variable speed drive pulley according to claim 11, characterized in that, an anti-friction material coating being provided transversely, in the axial direction considered, at the end of the assembly formed by the mobile flange, its bush and the associated abutment spacer, said anti-friction material coating is carried by the collar of said abutment spacer.

13. Variable speed drive pulley according to claim 1, characterized in that the collar of the abutment spacer consists of a simple folded edge of the latter.

14. Variable speed drive pulley according to claim 1, characterized in that the collar of the abutment spacer consists of a folded edge of the latter doubled in surface area by folding back this folded edge on itself in the direction away from the axis of the assembly.

15. Variable speed drive pulley according to claim 1, characterized in that the seal is axially stressed in its housing.

* * * * *